United States Patent [19]

Park

[11] Patent Number: 5,772,548

[45] Date of Patent: Jun. 30, 1998

[54] POWER TRAIN OF AUTOMATIC TRANSMISSION FOR VEHICLE

[75] Inventor: Donghoon Park, Kyungki-do, Rep. of Korea

[73] Assignee: Hyundai Motor Co., Ltd., Seoul, Rep. of Korea

[21] Appl. No.: 467,804

[22] Filed: Jun. 6, 1995

[30] Foreign Application Priority Data

Jun. 23, 1994 [KR] Rep. of Korea .................. 94-14446

[51] Int. Cl.$^6$ ............................................. F16H 47/08
[52] U.S. Cl. ........................... 475/44; 475/46; 475/275
[58] Field of Search ............................ 475/275, 276, 475/279, 280, 281, 282, 283, 43–47

[56] References Cited

U.S. PATENT DOCUMENTS

| | | | |
|---|---|---|---|
| 2,324,713 | 7/1943 | McFarland | 475/44 |
| 2,572,007 | 10/1951 | Burtnett | 475/46 |
| 2,718,796 | 9/1955 | Gautier | 475/44 |
| 2,762,238 | 9/1956 | Baker | 475/44 |
| 3,049,027 | 8/1962 | Mamo | 475/43 X |
| 3,270,585 | 9/1966 | Livezey | 475/46 |
| 3,371,555 | 3/1968 | Tuck et al. | 475/44 |
| 4,143,562 | 3/1979 | Murakami et al. | 475/276 |
| 4,258,586 | 3/1981 | Numazawa et al. | 475/281 X |
| 4,869,128 | 9/1989 | Ohkubo | 175/48 X |
| 4,942,779 | 7/1990 | Ohkubo | 475/48 X |
| 5,222,923 | 6/1993 | Hotta et al. | 475/276 |
| 5,261,861 | 11/1993 | Lemieux | 475/275 |

FOREIGN PATENT DOCUMENTS

| | | | |
|---|---|---|---|
| 475410 | 3/1992 | European Pat. Off. | 475/276 |
| 2627844 | 1/1977 | Germany | 475/44 |
| 3713989 | 11/1987 | Germany . | |
| 52-3976 | 1/1977 | Japan | 475/44 |
| 62-258261 | 11/1987 | Japan | 475/45 |
| 2-150533 | 6/1990 | Japan | 475/276 |
| 1008539 | 3/1983 | U.S.S.R. | 475/44 |
| 95/01522 | 1/1995 | WIPO | 475/47 |

OTHER PUBLICATIONS

Society of Automotive Engineers, Paper #911941, "Lever Anology", 1981.

*Primary Examiner*—Khoi Q. Ta

[57] ABSTRACT

A power train of an automatic transmission for a vehicle, which automatically and successively accomplishes a change of speed in a low speed range where driving time is short and a shift impact is severe, directly connects a transmission in high speed range where a high mechanical efficiency of power transmission is required, thereby reducing the shift impact, improving a specific fuel consumption, minimizing the number of one-way clutches for the shift impact and being simply designed.

32 Claims, 12 Drawing Sheets

FIG.6

| Ranges | | B1 | B2 | C1 | C2 | C3 | B3 | F2 | Engine Brake |
|---|---|---|---|---|---|---|---|---|---|
| P | | | | | | | | | |
| R | | | ○ | | | | ○ | | ○ |
| N | | | | | | | | | |
| D | 1 | ○ | | | | | | ○ | |
| D | CV | ○ | | | ○ | | | ○ | |
| D | 2 | | | ○ | | | | ○ | |
| D | 3 | | | ○ | ○ | ○ | | | ○ |
| III | 1 | ○ | | | | | | ○ | |
| III | CV | ○ | | | ○ | | | ○ | |
| III | 2 | | | ○ | ○ | | ○ | | ○ |
| II | 1 | ○ | | | | | | ○ | |
| II | CV | ○ | | | ○ | | ○ | | ○ |
| L | 1 | ○ | | | | | ○ | | ○ |
| Holding Mode | | ○ | | | | ○ | | | ○ |

POWER TRAIN OF AUTOMATIC TRANSMISSION FOR VEHICLE

BACKGROUND OF THE INVENTION

1. Field of the Invention

This invention relates to a power train of an automatic transmission for a vehicle, and, more particularly, to a power train which automatically and continuously accomplishes gear shifting in a low speed range where shift impact is severe, thereby improving shift quality, and which increases mechanical efficiency of a power transmission in a high speed range, thereby improving a specific fuel consumption.

2. Description of Related Art

In general, an automatic transmission for a conventional vehicle comprises a transmission control unit for automatically controlling a transmission gear ratio in accordance with a driving condition of the vehicle.

The transmission control unit controls application and releasing a plurality of clutches and brakes disposed on a gear train to regulate the number of revolutions of an output end of a planetary gear unit.

In order to design a gear train which can output four-forward speed ratio and one-reverse speed ratio, one compound planetary gear unit and at least five friction members are required. The design of a gear train having a good shift quality should utilize one compound planetary gear unit, seven friction members and three one-way clutches.

Such a gear train, however, is complicated in its structure, and is heavy in weight.

Since the conventional automatic transmission has a limited number of shifting stages, a shift impact is inevitably generated and the specific fuel consumption and power efficiency are deteriorated.

Further, in a low speed range, a gear shift is frequently accomplished with large input torque so that the shift impact frequently occurs, and in a high speed range, the gear train is directly connected with the input means so that the mechanical efficiency of the power transmission decreases.

SUMMARY OF THE INVENTION

It is an object of the present invention to provide a power train which automatically and successively shifts speed in a low speed range so that it can minimize shift impact.

It is another object of the present invention to provide a power train which directly connects a gear train and an output end of an engine with each other in a high speed range so that it can maximize the mechanical efficiency of power transmission and improve a specific fuel consumption.

It is still another object of the present invention to provide a power train which minimizes the number of one-way clutches and friction members so that it can be simply designed and improve the general efficiency of a transmission.

To achieve the above objects, the present invention provides a power train of an automatic transmission for a vehicle, comprising:

a torque converter for receiving power transmitted from an engine and converting the power to torque;

a first transmission mechanism, to which a first ring gear of a compound planetary gear unit including two simple planetary gear units, is disposed to be controlled by a third friction element mounted on a transmission case, a second ring gear which is connected with a first sun gear and functions as a reacting force element or an input element, is disposed to be controlled by a second friction element, where first and second pinion gears of the compound planetary gear unit are interconnected by a first power delivering member and output a transmission gear ratio;

a second transmission mechanism, including:
  a simple planetary gear unit having a third sun gear for receiving power from the first power delivering member to increase the transmission gear ratio of the first transmission mechanism;
  a second one-way clutch making a third sun gear of the simple planetary gear to rotate in a direction of the engine driving only;
  a sixth friction element for enabling the third ring gear to function as the reacting force element; and
  a fifth friction element selectively connected with an output end of the compound planetary gear unit to output a transmission gear ratio equal to the first transmission mechanism; and a third transmission mechanism achieving a final reduction by increasing the transmission gear ratio of the second transmission mechanism.

BRIEF DESCRIPTION OF THE DRAWINGS

Further objects and other advantages of the present invention will become apparent from the following description in conjunction with the attached drawings, in which:

FIG. 6 is an operating element table for each shifting speed range of the automatic transmission in accordance with the embodiments of the present invention;

DETAILED DESCRIPTION OF THE PREFERRED EMBODIMENTS

Figure 1:
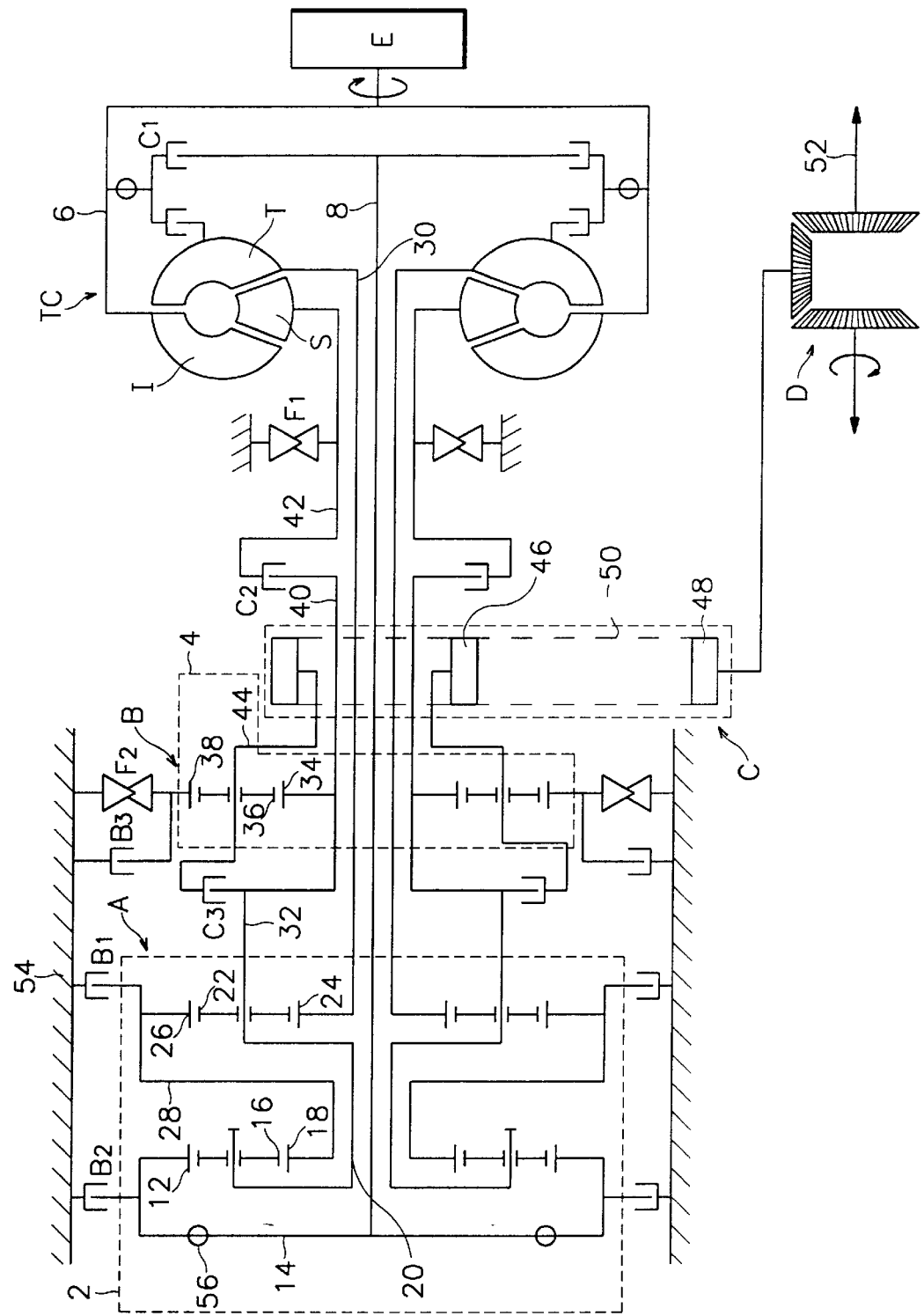
FIG. 1 is a power train showing a drive line in accordance with a first embodiment of an automatic transmission according to the present invention.

FIG. 1 shows a power train of a first embodiment according to the present invention, in which the power train comprises a torque converter TC which is rotated by power of an engine E, a first transmission mechanism A having a compound planetary gear unit 2 which receives torque converted by the torque converter TC to output a proper reduction gear ratio, a second transmission mechanism B having a simple planetary gear unit 4 which reduces again the reduction gear ratio outputted from the first transmission mechanism A, a third transmission mechanism C which reduces the reduction gear ratio outputted from the second transmission mechanism B.

The torque converter TC includes an impeller I which is directly connected to a crankshaft of the engine to receive power therefrom, a turbine T which is disposed against the impeller and rotates by spouted oil, a stator S which is disposed between the impeller and the turbine to change flow of the oil thereby increasing rotary power of the impeller.

The impeller I is connected to the engine E by a shell cover 6 on which a first friction element C1 is disposed to directly transmit power of the engine to a first shaft 8.

The first shaft 8 is connected to a first ring gear 12 of the compound planetary gear unit 2 by a hub 14, such that the ring gear 12 meshes with a first pinion gear 16 and the first pinion gear 16 meshes with a first sun gear 18, whereby the power can be delivered to the vehicle.

The first pinion gear 16 is connected to a second pinion gear 22 by a first power transmission member 20, and the second pinion gear 22 meshes with a second sun gear 24 to transmit the power thereto.

The second pinion gear 22 meshes with a second ring gear 26, and the second ring gear 26 is connected by a second power delivering member 28 to the first sun gear 18, the second power delivering member 28, is selectively locked by a second friction element B1 such that the first sun gear 18 and the second ring gear 26 can function as the reacting element to output a reduction gear ratio of a first speed.

Further, the hub 14 can be selectively locked by a third friction element B2 to make the first ring gear 12 be the reacting element, such that when the second sun gear 24 becomes the input element, the first power transmitting member 20 can rotate counterclockwise when viewed form the engine side, that is, in a direction opposite to the direction of the input.

The second sun gear 24 is connected to the turbine T by a third power delivering member 30 thereby receiving torque therefrom. The first power delivering member 20 which connects the first pinion gear 16 to the second pinion gear 22 is connected to a third sun gear 34 of the simple planetary gear unit 4 by a fourth power delivering member 20.

The third sun gear 34 meshes with a third pinion gear 36 to transmit the power thereto, and the third pinion gear 36 meshes with a third ring gear 38.

A fifth power delivering member 40 is connected to the third sun gear 34 and a fourth friction element C2 is disposed between a sixth power delivering member 42 directly connected to a stator S and the fifth power delivering member 40 to selectively receive the torque of the stator S.

The sixth power delivering member 42 has a structure such that the stator S is connected to a first one-way clutch F1 for preventing the stator S from being rotated counterclockwise when viewed from the engine side.

A planetary carrier 44 connected to the third pinion gear 36 is designed to be selectively connected at its extending to a fourth power delivering member 32 by a fifth friction element C3, whereby the simple planetary gear unit 4 has two input elements. Further, a third transmission mechanism C is connected to the longitudinal end portion of the planetary carrier 44, the third transmission mechanism C is connected with a transfer driving sprocket 46 and a transfer driven sprocket 48 by a chain 50, such that the output from the third transmission mechanism C can rotate an axle 52 through a differential gear D.

The third ring gear 38 can function as a reacting force element by a sixth friction element B3 mounted on a transmission case 54 and is connected to a second one-way clutch F2 which suppresses the rotation in the same direction as the one-way clutch F1.

When the first axle 8 is directly connected to the engine by applying the first friction element C1, impact can occur. It is preferred to dispose a damper 56 between the hub 14 and the first ring gear 12 for minimizing the impact.

When the engine drives, the impeller I of the torque converter TC connected to an output shaft of the engine by a shell cover 6 rotates, such that this rotary power rotates the turbine by spouting the oil in the turbine, and the rotary power of the turbine is transmitted to the second sun gear 24 of the compound planetary gear unit 2 through the third power transmitting member 30.

At this point, although the stator S in the torque converter TC intends to rotate in an opposite direction of the engine, the rotation is obstructed by the first one-way clutch F1 thereby accomplishing an increased dividend ratio operation of the torque.

In this state, if the vehicle speed gradually increases and the torque converter TC is in the coupling state, the stator S starts free wheeling upon receiving the force in the rotating direction of the engine.

At this point, the rotary power transmitted from the turbine T to the third power delivering member 30 rotates the second sun gear 24 thereby rotating the second pinion gear 22 meshed with the second sun gear 24 counterclockwise when viewed from the engine side.

However, as shown in FIG. 6 illustrating the operating elements table, because no friction element at "N" range or "P" range functions as the friction element, the power of the engine is not outputted.

In this state, if a gear shift lever is selected in the drive D range, the second friction element B1 of the first transmission mechanism A is to be applied by the transmission control unit to lock the first sun gear 18 of the compound planetary gear unit 2 and the second ring gear 26.

Then, the second sun gear 24 functions as the input element and the second ring gear 26 functions as the reacting force element, whereby the fourth power delivering member 32 functions as the output element.

Figure 4:
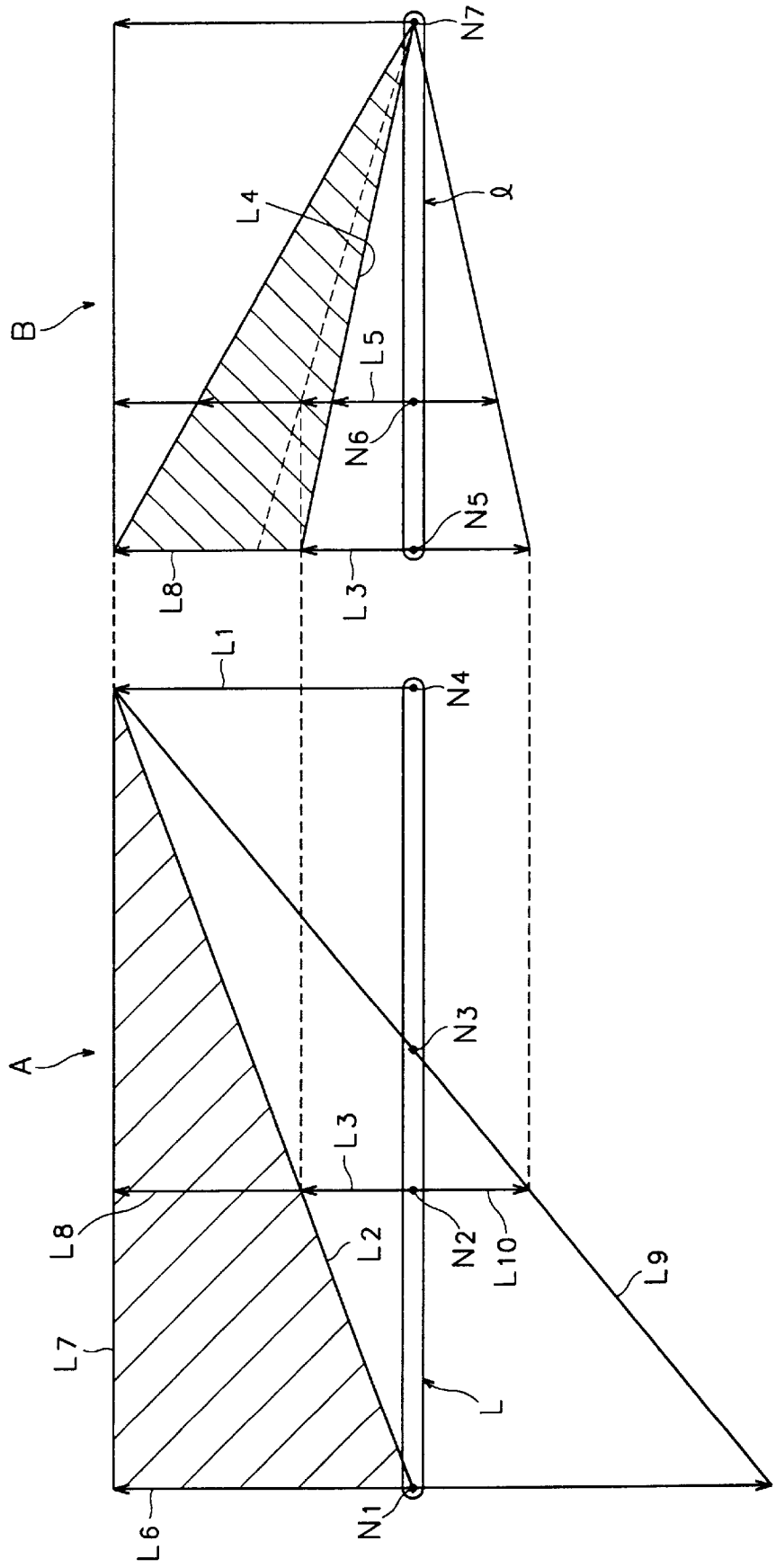
FIG. 4 is a graph for illustrating a gear ratio of the automatic transmission in accordance with the embodiments of the present invention with a lever analogy.

FIG. 4 illustrates a speed ratio by the lever analyzing method, the left side end of a lever L can be indicated as a first node N1 where the first sun gear 18 and the second ring gear 26 are existing, the next position can be indicated as a second node N2 where the first power delivering member 20 and the fourth power delivering member 32 are existing, another next position can be indicated as a third node N3 where the first ring gear 12 is existing and the right side end of the lever L can be indicated as a fourth node N4 where the second sun gear 24 is existing.

Accordingly, the fourth node N4 becomes the input end and the first node N1 becomes a fixed end. At this point, a straight line L2 is obtained by connecting any position of an input speed line L1 of the fourth node N4 to the first node N1, and a line obtained by connecting the line L2 to the second node N2 is an output speed line L3.

Accordingly, the transmission gear ratio becomes (the length of the input speed line L1) over (the length the output speed line L3), that corresponds to a first speed transmission gear ratio.

As the first speed transmission gear ratio is transmitted to the third sun gear 34 of the simple planetary gear unit 4 through the fourth power delivering member 32 and is transmitted to the third ring gear 38 through the third pinion gear 36, a force intends to rotate the third ring gear 38 counterclockwise when viewed from the engine side, but it is obstructed to rotate counterclockwise by the second one-way clutch F2.

Accordingly, as the third ring gear 38 functions as the reacting force element in the second transmission mechanism B and the third sun gear 34 functions as the input element, the planetary carrier 44 connected with the transfer driving sprocket 46 functions as the output element.

At this point, nodes of a lever [1] of the second transmission mechanism B becomes a fifth node N5 whose left side end becomes a node of the third sun gear 34, a sixth node N6 becoming the node of the planetary carrier 44 and a seventh node N7 whose left side end becomes the node of the third ring gear 38.

At this point, the number of revolutions inputted into the fifth node N5 becomes L3 because it is the output speed of the first transmission mechanism A, and as the straight line L5 connecting the straight line L4 which connects the speed line L3 to the seventh node N7 and the sixth node N6 becomes the output speed line of the second shifting speed portion B. Therefore, the whole gear transmission ratio of the gear train is accomplished.

This transmission gear ratio is transmitted to the transfer driven sprocket 48 driven by the chain and to the transfer driving sprocket 46, thereby reducing speed again and driving the axle 52 through the differential gear D.

That is, the whole transmission gear ratio of the first speed becomes the reduction gear ratio of the compound planetary gear unit 2 → the reduction gear ratio of the simple planetary gear unit 4 → the reduction gear ratio by the gear ratio of the transfer driving sprocket 46 and the transfer driven gear sprocket 48 (the third transmission mechanism C).

In this first speed state, the second one-way clutch F2 is in a free wheeling state by a clockwise reacting force so that engine brake effect is not obtained during coasting, but during a manual mode the sixth friction element B3 is applied to obtain the engine brake effect.

In this first speed mode, if the speed of the stator S comes to a predetermined speed or the torque converter TC is in the coupling state, the transmission control unit applies the fourth friction element C2 and directly connects the stator S to the fifth power delivering member 40 connected with the fourth power delivering member 32.

At this time, the torque of the stator S is added to the fourth power delivering member 32 in the state of being outputted with the transmission gear ratio of the first speed mode so that the speed of revolution of the transfer driving sprocket 46 increases more than that of the first speed mode.

Accordingly, the torque of the turbine T decreases as much as the torque transmitted to the transfer driving sprocket 46 by the stator S so that the whole output torque decreases.

Figure 2:
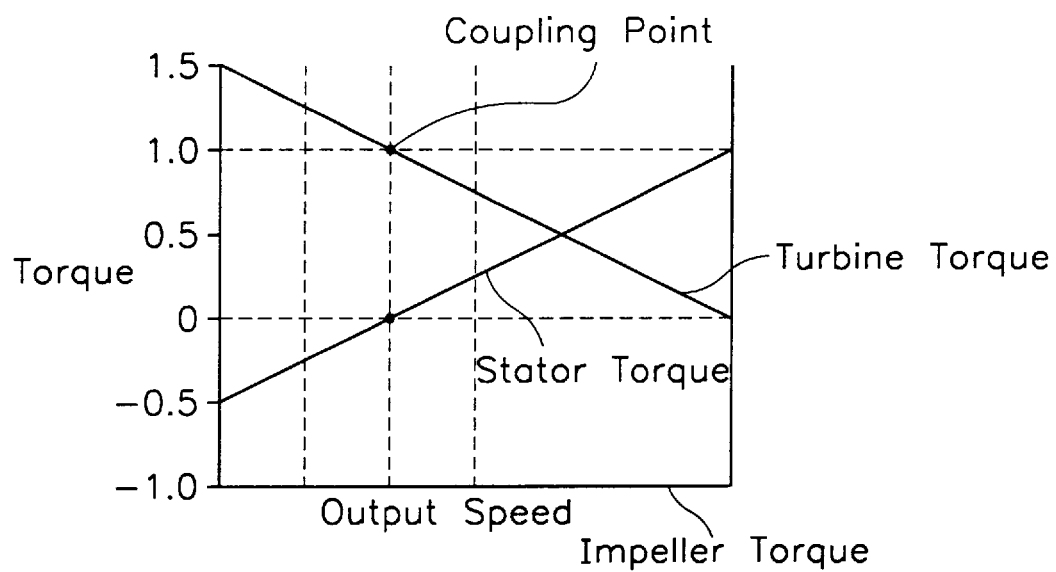
FIG. 2 is a graph showing the relationship of output speed and torque of a turbine and a stator in automatic successive modes of the automatic transmission in accordance with embodiments of the present invention.
Figure 3:
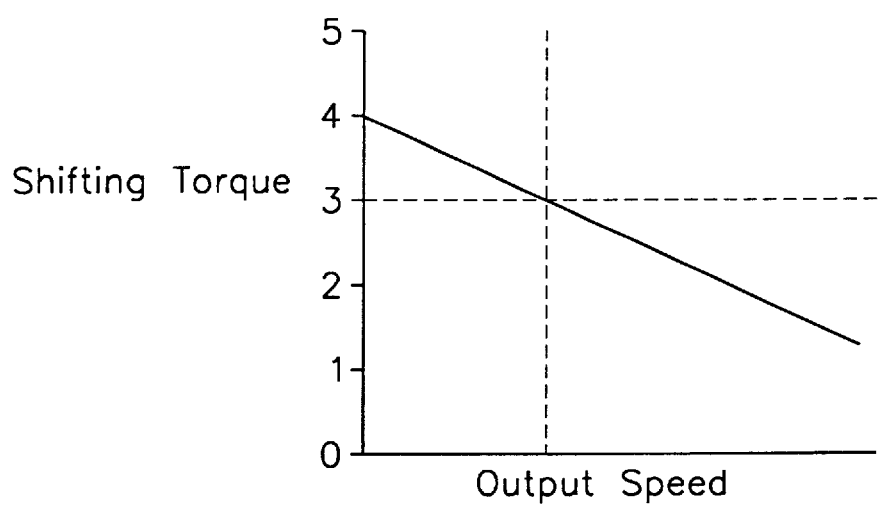
FIG. 3 is a graph showing the relationship of the output speed and output torque of a transmission in the automatic successive modes of the automatic transmission in accordance with the embodiments of the present invention.

This state is a successive shifting speed state before an up-shifting to the second speed, and the relation of the output speed and the torque is illustrated in FIGS. 2 and 3.

That is, the successive shifting speed range starts from the moment when the torque of the stator S is transmitted to the transfer driving sprocket 46, at this time, the torque of the impeller is constant, but that of the turbine decreases and that of the stator increases.

Further, as the output speed increases, as the ratio of the transmission torque decreases, whereby the shifting speed is successively accomplished until the range where the torque converter comes to the coupling state again. At this time, the transmission gear ratio is automatically selected.

If the load of the vehicle is light, the time for the torque converter to come to the coupling state is short so that the time to come to a second speed direct connecting mode is short. On the contrary, if the load of the vehicle is heavy, the time for the torque converter to come to the coupling state is long so that the driving time is long in low-speed range.

In case that substantial kick-down is required in this shifting speed mode, if the torque is transmitted from the stator S to the fifth power delivering member 40 by releasing the fourth friction element C2, the speed is instantaneously shifted to the first speed stating mode, therefore, the torque increases so that kick-down effects can be obtained therefrom.

In case only a little kick-down is required, if the stator S is maintained to be connected with the fifth power delivering member 40, this stator receives the torque of the same opposite direction during stall so that the speed of the stator S reduces and the torque of the turbine T increases, whereby the whole torque increases and the kick-down effects can be obtained therefrom.

Of course, the shift impact does not occur at this time, but the impact which can be generated in a moment that the stator is connected with or separated from the fourth power delivering member 32 by applying/releasing of the fourth friction element C2 is absorbed because the stator S is in the torque converter TC so that the torque converter serves as a big damper.

The whole transmission gear ratio during automatic successive shifting speed becomes the successive reduction gear ratio of the compound planetary gear unit → the reduction gear ratio of the simple planetary gear unit → the reduction gear ratio of the transfer driving sprocket and transfer driven sprocket. Of course, the engine brake effect is not obtained during coasting.

In this automatic successive shifting speed mode, if the vehicle speed gradually increases and the speed of the stator S comes to a predetermined speed or the torque converter TC comes to the coupling state, the transmission control unit releases the second friction element B1 and controls the first friction element C1 to be in the engaging state.

By this control, the output of the engine is transmitted to the first shaft 8 through the first friction element C1, is then transmitted to the first ring gear 12 of the compound planetary gear unit 2 and is thereby transmitted to the second sun gear 24 through the third power delivering member 30 so that the compound planetary gear unit 2 has two input elements.

Accordingly, because the first node N1 and fourth node N4 of the first transmission mechanism A become an input node as shown in FIG. 4, the straight line L8 connecting the straight line L7 interconnecting the input speed lines L1 and L6 to the second node N2 becomes the output speed line of the first transmission mechanism A.

That is, the compound planetary gear unit 2 is in a direct connecting state and outputs the transmission gear ratio of the second speed, and in the second transmission mechanism B, the reduction speed operation is accomplished in the same manner as the first speed starting mode.

At this time, the first friction element C1 is applied and the compound planetary gear unit 2 is directly connected with the engine so that high mechanical efficiency of the power transmission can be obtained, and because the fourth friction element C2 is in releasing state, the stator S becomes free wheeling so that the power loss within the torque converter TC becomes zero.

This shifting speed is accomplished in a state that the speed gap between the speed of the turbine T and the first ring gear 12 right before shifting speed and the speed of the engine is few or very small. Therefore, the shift impact is minimized.

Of course, vibration from the engine can be absorbed by the damper 56 mounted on the hub 14.

The whole transmission gear ratio of this forward second speed starting mode becomes the direct connection of the compound planetary gear unit → the reduction gear ratio of the simple planetary gear unit → the reduction gear ratio of the transfer driving sprocket and transfer driven sprocket.

In this state, if the vehicle speed further increases, the transmission control unit applies the fourth friction element C2 of the first transmission mechanism A in the state of the second speed stating mode and applies the fifth friction element C3 of the second transmission mechanism B in addition.

Then, the first transmission mechanism A and the second transmission mechanism B are respectively in the direct connecting state and output the transmission gear ratio of the third speed.

As shown in FIG. 4, the straight line L8 corresponding to the output speed of the first transmission mechanism A is introduced to the second transmission mechanism B and is outputted without shifting speed.

At this time, the engine and torque converter are directly connected with each other such that every element of the first and second transmission mechanism is directly connected so that the maximum mechanical efficiency of the power transmission can be obtained, the engine brake effect is obtained during coasting.

And, as shown in FIG. 6, because the fourth friction member C2 and the sixth friction element B3 are applied, the engine brake effect is obtained during coasting in the second speed of the "III" range.

Further, because the fourth and sixth friction elements C2 and B3 are applied, the engine brake effect is also obtained during coasting in the "II" range automatic successive shifting speed mode.

The engine brake effect is also obtained during coasting in the "L" range, which is accomplished by applying the second friction element B1 and the sixth friction element B3 at the first shifting speed portion A and locking the first sun gear 18.

Figure 5:
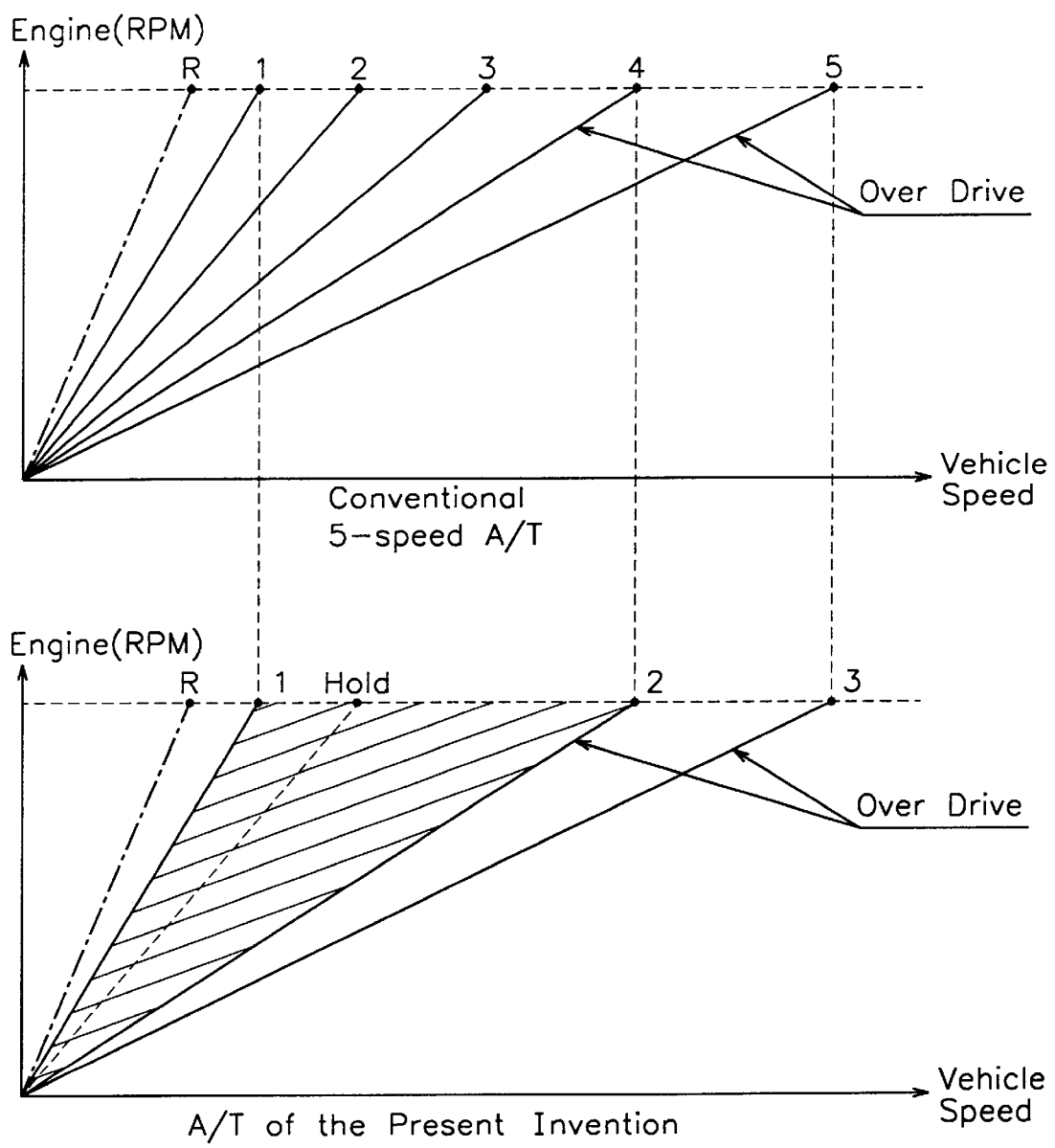
FIG. 5 is a graph comparing a distribution of a transmission gear ratio of the automatic transmission in accordance with the embodiments of the present invention and that of a five speed automatic transmission of the prior art.

Hereinabove, processes of the shifting speed during forward driving were described. As shown in FIG. 5, the first speed transmission gear ratio of the conventional automatic transmission and that of the present invention are equal to each other, the automatic shifting speed is successively accomplished to the fourth speed transmission gear ratio of the conventional transmission in the automatic successive shifting speed range, whereby the shift impact does not occur in low speed range.

If the gear shift lever is selected to the reverse "R" range, the transmission control unit applies the third friction element B2 at the first transmission mechanism A and operates the sixth friction element B3 at the second transmission mechanism B thereby makes the second sun gear 24 of the compound planetary gear unit 2 to be the input element, makes the first ring gear 12 to be the reacting force element and makes the fourth power delivering member 32 to be the output element.

Then, as shown in FIG. 4, when the straight line L9, which connects the input speed line L1 inputted into the fourth node N4 with the third node N3, is connected to the first node N1, the straight line L10, which connects the straight line L9 with the second node N2, becomes the reverse reduction gear ratio.

As the reduction gear ratio is transmitted to the second transmission mechanism B, it is shifted in accordance with the gear ratio, and it is increased by the reacting force element of the third ring sprocket 48 of the second transmission mechanism B, whereby it is transmitted to the differential gear D through the transfer driving sprocket 46 and the transfer driven sprocket 48.

In case that a second speed holder is required, that is, in case the slip of the driving wheel occurs during driving on a slippery road surface and so on, the transmission control unit applies the second friction element B1 and fifth friction element C3 thereby making the first transmission mechanism A shift to the first speed state to avoid a quick start, and maintains the simple planetary gear unit 4 of the second transmission mechanism B in a direct connecting state so that a new transmission gear ratio illustrated with a dotted line between the first speed and second speed at the second transmission mechanism B is formed as shown in FIG. 4.

At this time, the engine brake effect is obtained during coasting, and this mode can also be used when the driver moves the shift lever to the "II" range.

As described above, the operation of each shifting speed stage can be achieved by control as shown in FIG. 6, and "○" (circle) is an operating element in the drawing.

The advantages of the automatic transmission system according to the present invention are described hereinbelow.

1) In the low speed range where driving time is short and the shift impact is severe, the shifting speed is automatically and successively accomplished so that the shift impact is minimally generated whereby shift quality can be improved.

2) In a high speed range where the shift impact is not great but the driving time is long so that high mechanical efficiency of the power transmission of the shifting device is required for improving the specific fuel consumption, the transmission gear ratio when the transmission system is directly connected, can be outputted so that the improvement of the fuel consumption ratio can be maximized.

3) The number of the friction elements and clutches can be decreased to less than that of the prior automatic transmission in the entirety of shifting stages but the shift quality can be improved, so that it is very economical in the weight and cost of production.

Figure 7:
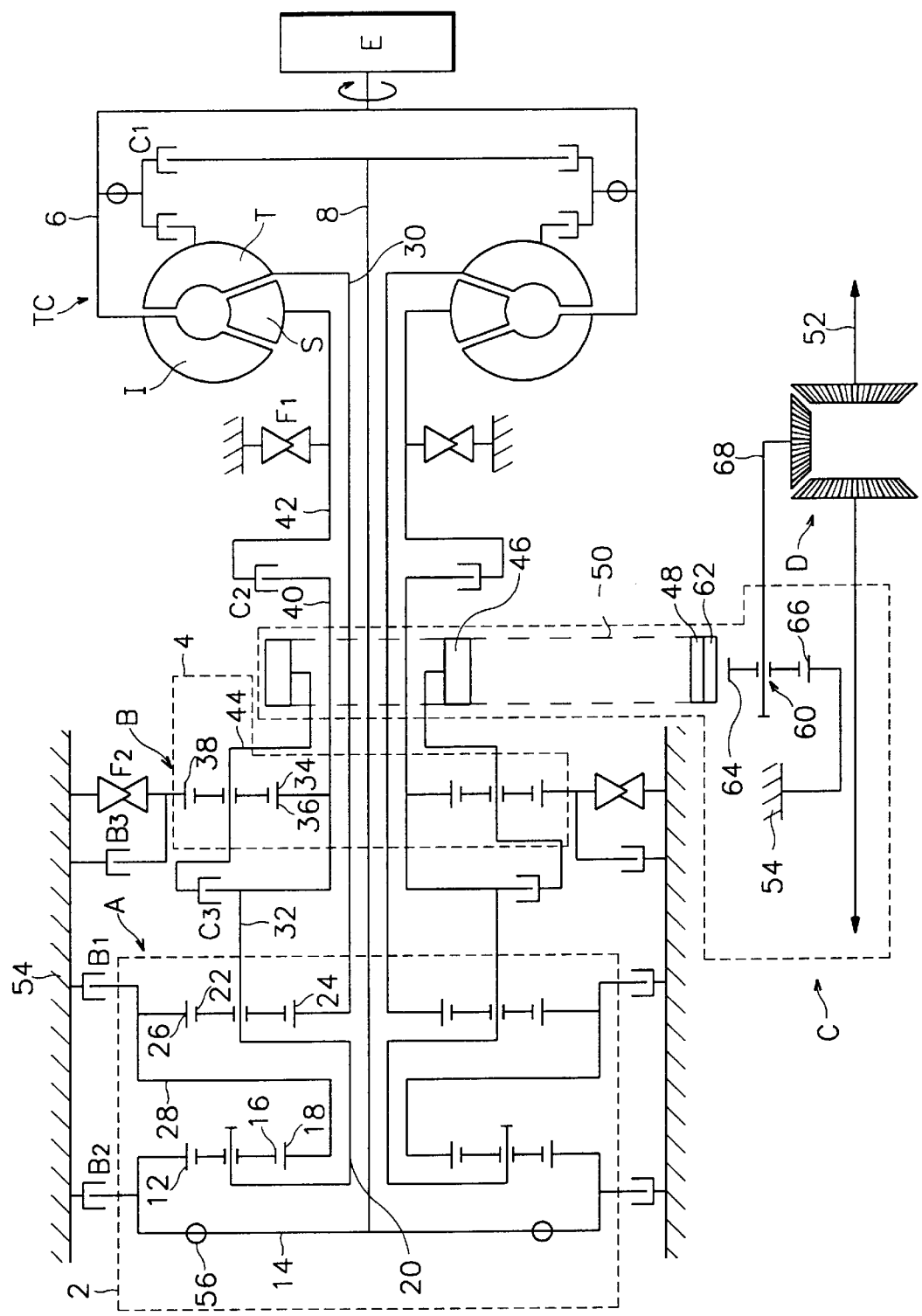
FIG. 7 is the power train showing the drive line in accordance with a second embodiment of the automatic transmission of the present invention.

FIG. 7 shows the power train in accordance with a second embodiment according to the present invention, wherein the first and second transmission mechanisms of the second embodiment are the same as those of the first embodiment but the third transmission mechanism of the second embodiment is different than that of the first embodiment.

The third transmission mechanism C is composed of a simple planetary gear unit 60 which has fourth pinion gears 64 meshed with the inside of a fourth ring gear 62 which is directly connected with the transfer driven sprocket 48 and becomes an input element, and a fourth sun gear 66 which meshes with the center of the pinion gear.

The fourth sun gear 66 is fixed to the transmission case 54 thereby becoming the reacting force element, and a carrier 68 connected with the fourth pinion gear 64 becomes the output element thereby driving the axle 52 through the differential gear D.

The power, as the first embodiment, shifted from the first and second transmission mechanism A and B is inputted into the fourth ring gear 62 through the transfer driven sprocket 48 in the state that the fourth sun gear 66 is fixed, whereby the carrier 68 rotates in the same direction of the fourth ring gear 62.

At this time, the speed of revolution of the carrier 68 is outputted slower than input speed of revolution, and this output drives the axle 52 through the differential gear D, whereby a sufficient final reduction gear ratio can be obtained.

Figure 8:
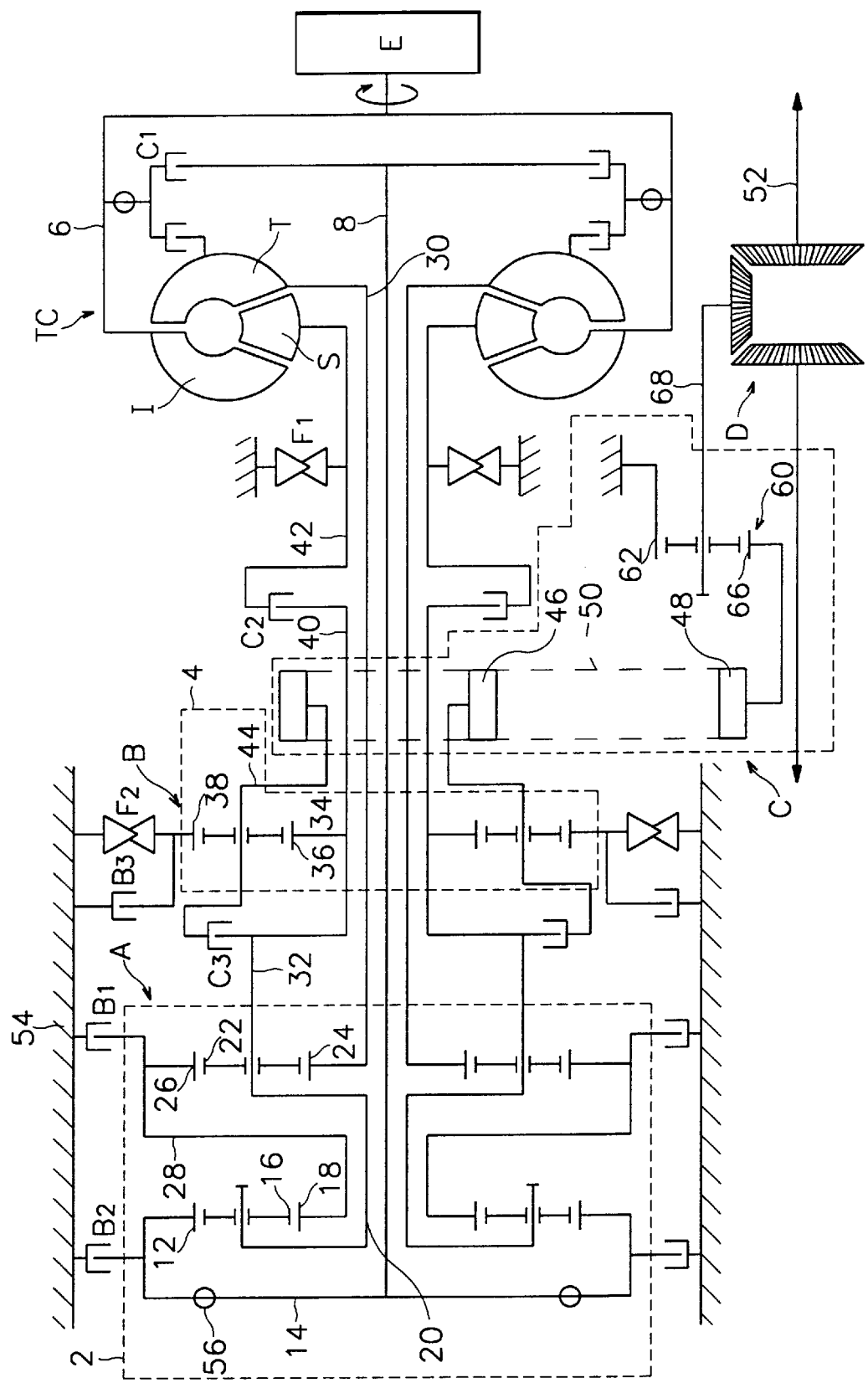
FIG. 8 is the power train showing the drive line in accordance with a third embodiment of the automatic transmission of the present invention.

FIG. 8 shows the power train of an embodiment according to the present invention, wherein the third transmission mechanism C is composed of the simple planetary gear unit 60 as the second embodiment.

Differences between the third and second embodiments are, in the third embodiment, the fourth ring gear 62 is fixed to the transmission case 54 thereby becoming a reacting force element, and the fourth sun gear 66 is connected to the transfer driven sprocket 48 thereby becoming an input element.

By this composition of the third transmission mechanism C, as the first embodiment, the power which is shifted from the first and second transmission mechanism A and B is inputted into the fourth sun gear 66 through the transfer driven sprocket 48 in a state that the fourth ring gear 62 is fixed, whereby the carrier 68 rotates in the same direction as that of the fourth sun gear 66.

At this time, the speed of revolution of the carrier 68 is outputted slower than the input speed of revolution, and this output drives the axle 52 through the differential gear D.

Figure 9:
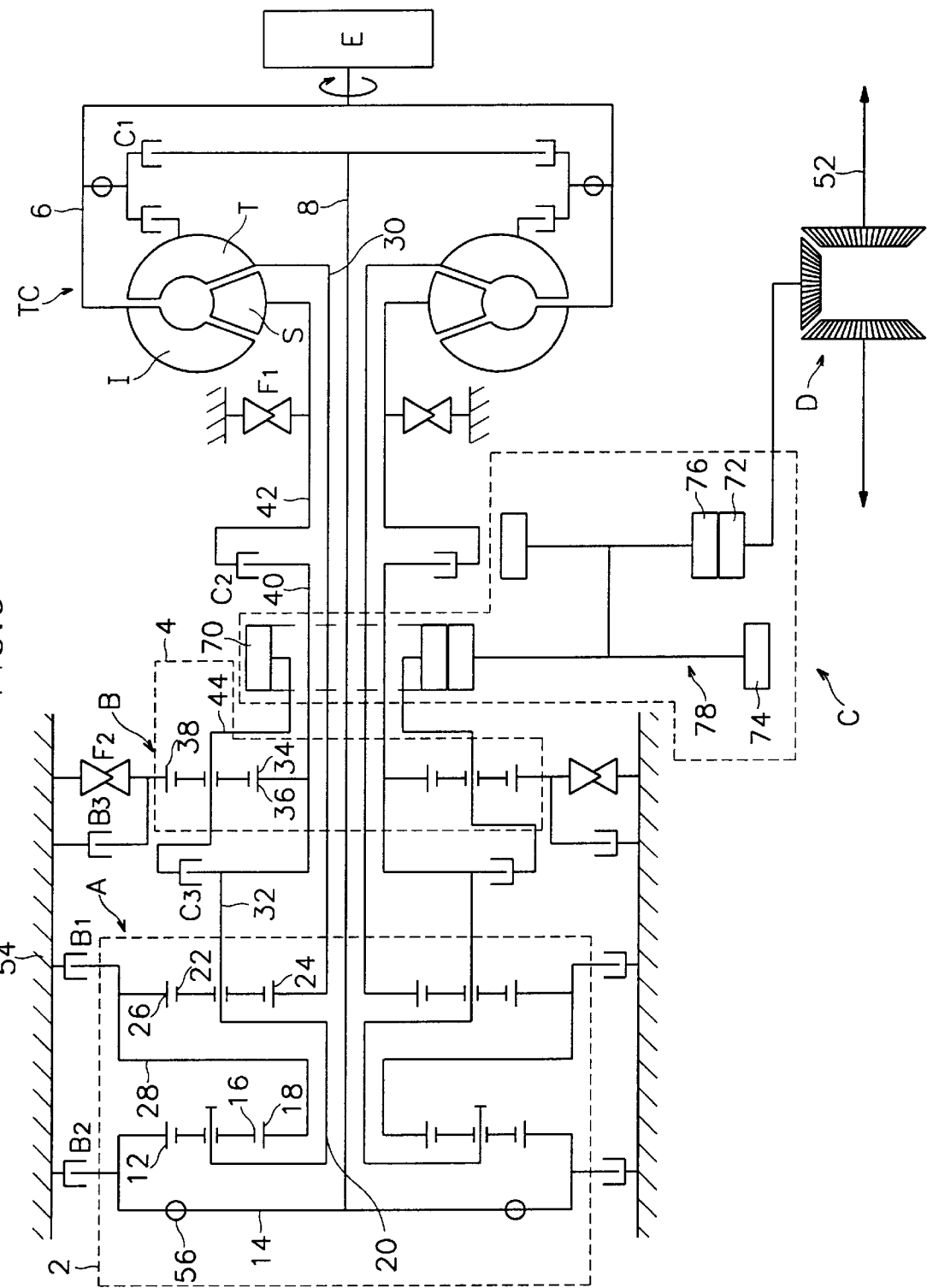
FIG. 9 is the power train showing the drive line in accordance with a fourth embodiment of the automatic transmission of the present invention.

FIG. 9 shows the power train in accordance with a fourth embodiment of the present invention, wherein the third transmission mechanism C does not use the simple planetary gear unit as the first and second embodiments. Instead, gears 70 and 72 take the place of the transfer driving sprocket 46 and the transfer driven sprocket 48 and a gear shaft 78 where a big gear 74 and a small gear 76 integrally mesh with the gears 70 and 72.

The big gear 74 of the gear shaft 78 meshes with the transfer driving gear 70 and the small gear 76 of the gear shaft 78 meshes with the transfer driven gear 72, and the output of the transfer driving gear 70 is transmitted to the transfer driven gear 72 in a state of being increased by the gear ratio of the big and small gears 74 and 76 thereby driving the gear shaft 52 through the differential gear D.

Figure 10:
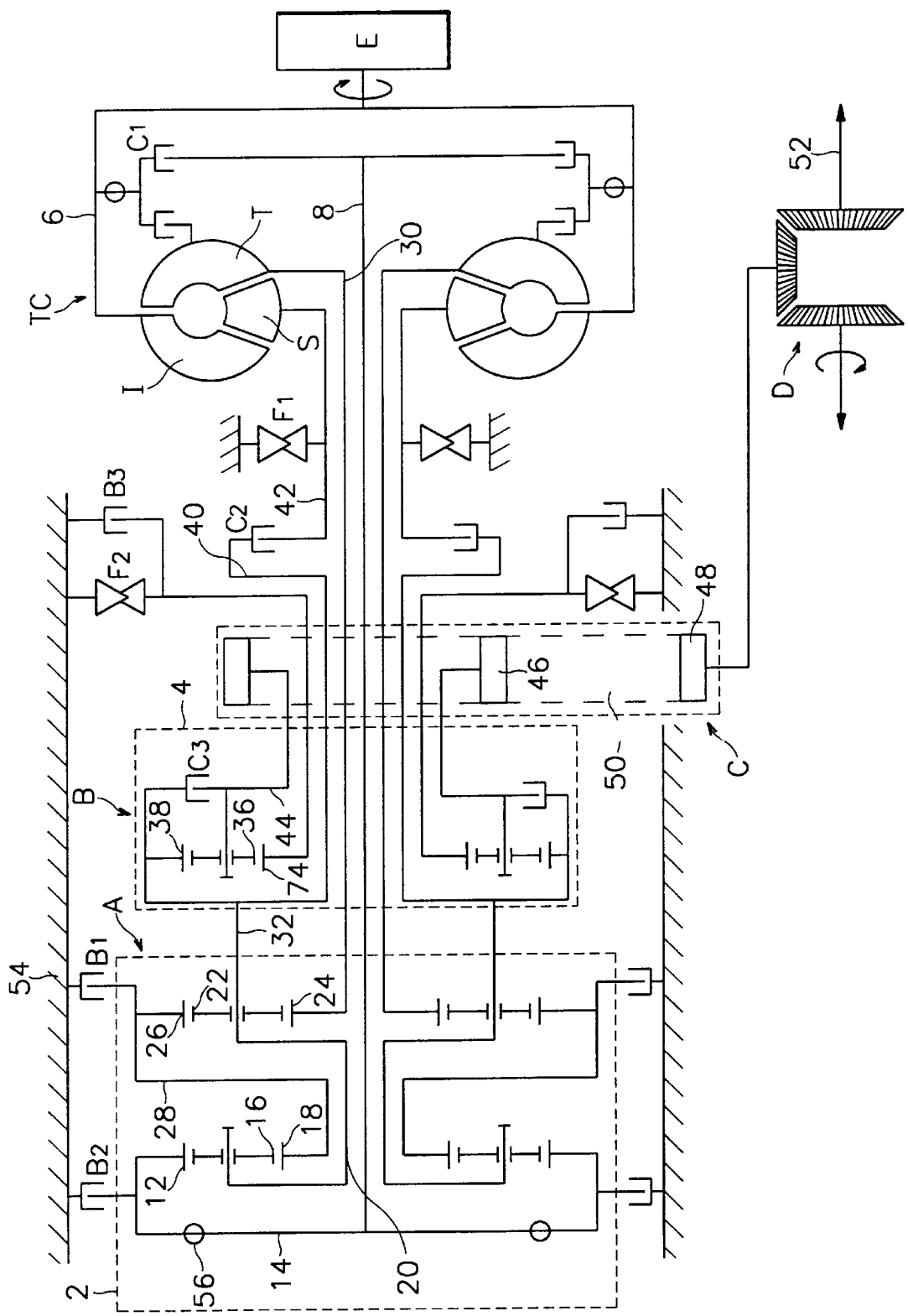
FIG. 10 is the power train showing the drive line in accordance with a fifth embodiment of the automatic transmission of the present invention.

FIG. 10 shows the power train in accordance with a fifth embodiment of the present invention, this fifth embodiment differing in connection of the simple planetary gear 4 of the second transmission mechanism B with the first embodiment according to the present invention.

That is, the fourth power delivering member 32 connected with the second pinion gears 22 is directly connected with the fifth power delivering member 40, and, to selectively receive the torque of the stator S, the fourth friction element C2 lies between the fifth power delivering member 40 and the stator S to connect them to each other.

Further, the fourth power delivering member 32 is connected with the planetary carrier 44, one side extending portion of the fourth power delivering member 32 is connected to the third ring gear 38, the fifth friction element C3 lies between the fourth power delivering member 32 and the planetary carrier 44, one side end portion of the planetary carrier 44 is connected to the third transmission mechanism C which is connected with the transfer driving sprocket 46 and transfer driven sprocket 48 by the chain 50, the output thereof rotating the axle 52 through the differential gear D.

Further, the third sun gear 34 can function as the reacting force element by the sixth friction element B3 disposed to the transmission case 54 and is connected to the second one-way clutch F2 for restraining the direction of the revolution to be the same as that of the first one-way clutch F1.

Accordingly, in the second transmission mechanism B, the third sun gear 34 functions as the reacting force element and the third ring gear 38 functions as the input element and the planetary carrier 44 connected with the transfer driving sprocket 46 functions as the output element.

At this time, the nodes of the lever [1] of the second transmission mechanism B are different than those of the first to fourth embodiments, that is, the fifth node N5 of FIG. 4 becomes the node of the third ring gear 38, the sixth node N6 becomes the node of the planetary carrier 44 and the seventh node of the right side end becomes the node of the third sun gear 36. Therefore, the description of the transmission gear ratio is omitted because it is the same as that of the first embodiment.

Figure 11:
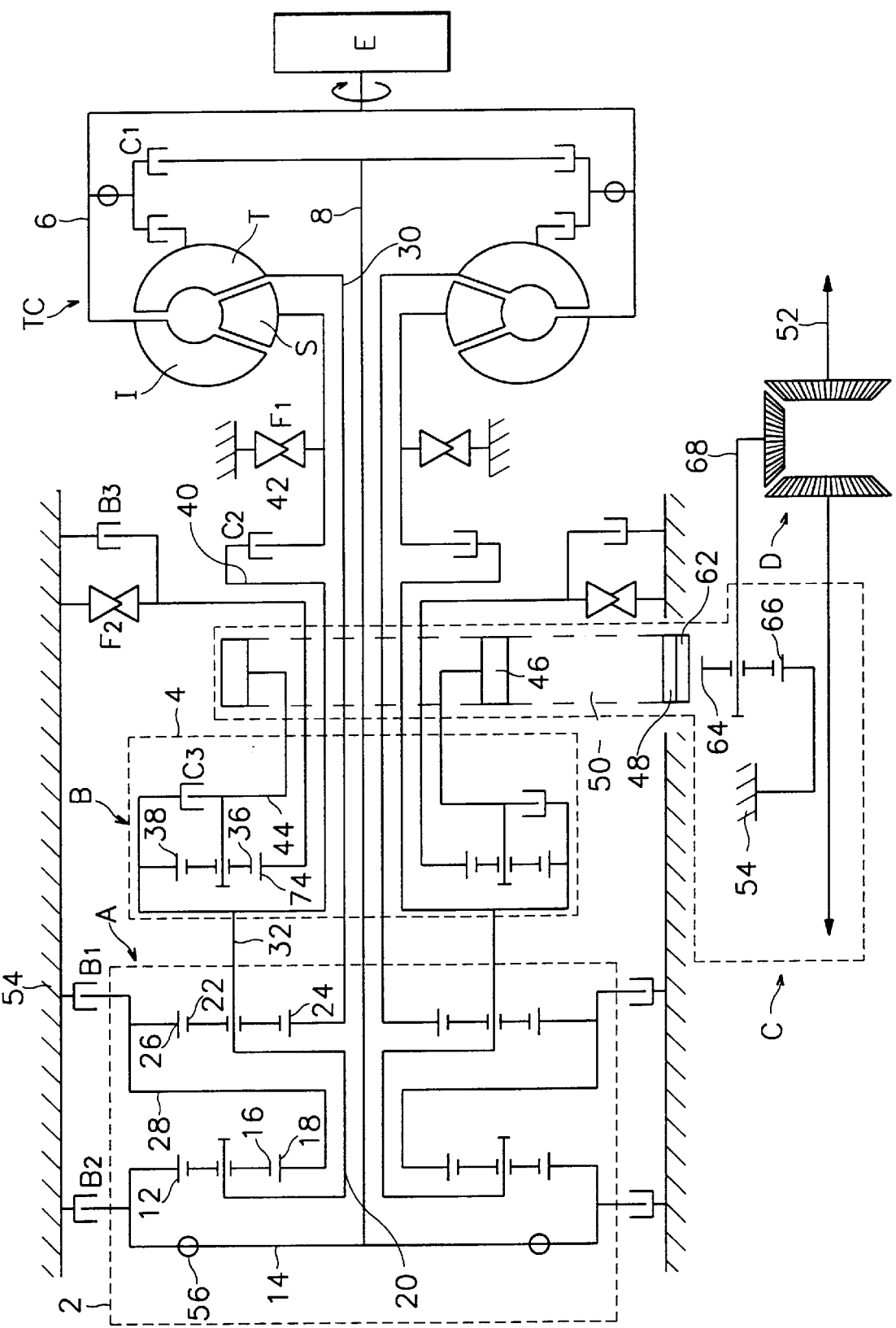
FIG. 11 is the power train showing the drive line in accordance with a sixth embodiment of the automatic transmission of the present invention.
Figure 12:
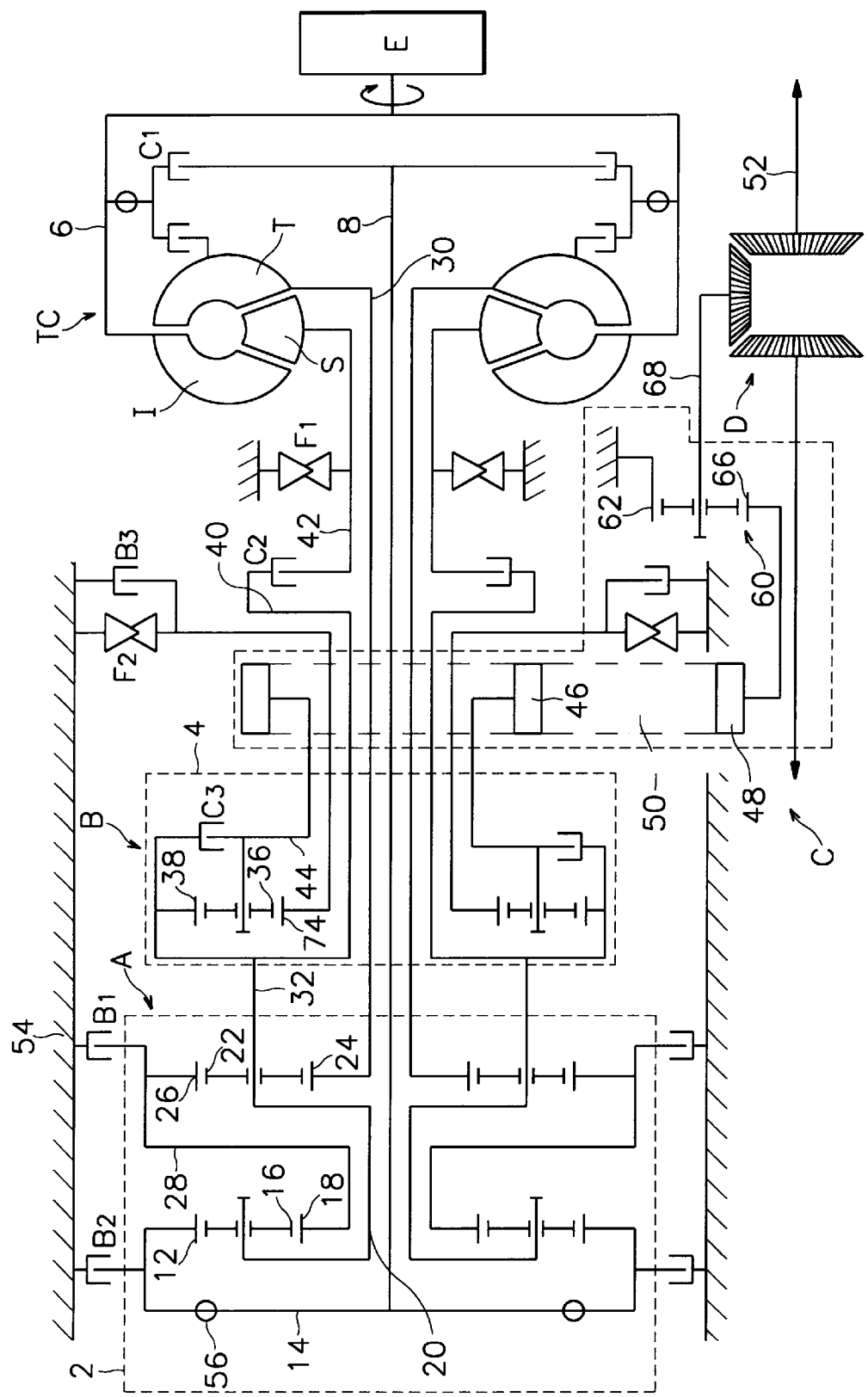
FIG. 12 is the power train showing the drive line in accordance with a seventh embodiment of the automatic transmission of the present invention.
Figure 13:
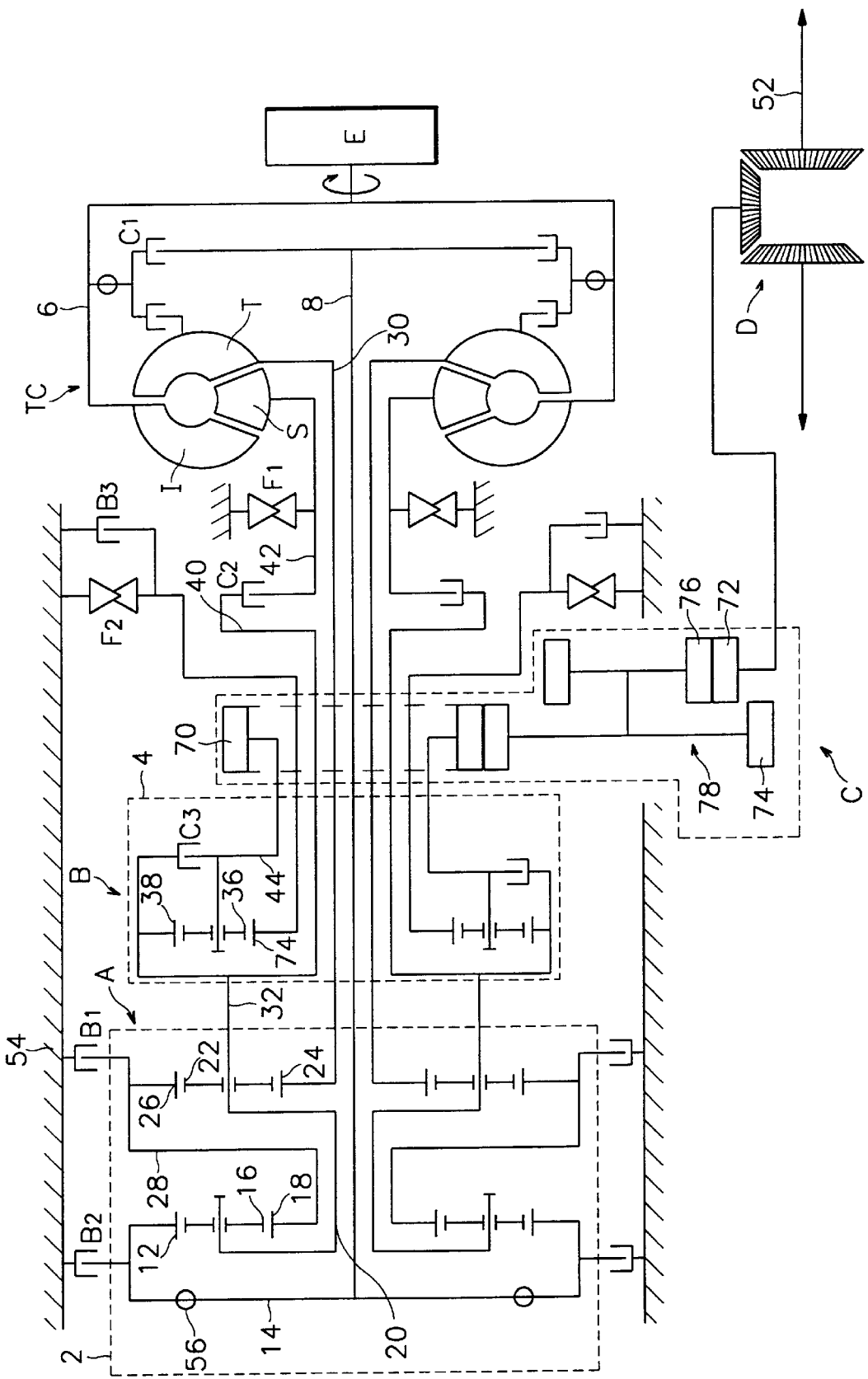
FIG. 13 is the power train showing the drive line in accordance with an eighth embodiment of the automatic transmission of the present invention.

FIG. 11 shows the power train in accordance with a sixth embodiment according to the present invention, the first transmission mechanism A and the second transmission mechanism B are the same as those of the fifth embodiment and the third transmission mechanism C is the same as that of the second embodiment. In a seventh embodiment of FIG. 12, the first transmission mechanism A and the second transmission mechanism B are the same as those of the fifth embodiment and the third transmission mechanism C is the same as that of the third embodiment. In an eighth embodiment of FIG. 13, the first transmission mechanism A and the second transmission mechanism B are the same as those of the fifth embodiment and the third transmission mechanism C is the same as that of the fourth embodiment.

In this power train, the first and second transmission mechanisms A and B do a shifting operation the same as those of the fifth embodiment and the third transmission mechanism C does the shifting operation the same as that of a pertinent embodiment. Therefore the description of the operation is omitted.

In the automatic transmission for a vehicle as described hereinabove, the present invention automatically and continuously accomplishes the shifting speed in a low speed range where the shift impact is severe thereby improving a shift quality, and also increases the mechanical efficiency of the power transmission in a high speed range thereby improving the specific fuel consumption.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A power train of an automatic transmission for a vehicle, comprising:

a torque converter for receiving power from an engine and having an impeller, a stator and a turbine;

transmission means, connected to said turbine, for selectively converting a speed of said turbine, said transmission means including, first transmission means, connected to said turbine, for selectively converting a speed of said turbine, second transmission means, connected to said first transmission means, for selectively converting an output speed of said first transmission mechanism, third transmission means, connected to said second transmission means, for reducing an output speed of said second transmission means to produce an output speed of said automatic transmission, and means for selectively connecting said second transmission means to said stator such that said output speed of said automatic transmission continuously varies between a first and second transmission gear ratio; and wherein said first transmission means includes a compound planetary gear unit including first and second simple planetary gear units, said first simple planetary gear unit including a first ring gear, a first planetary carrier of first pinion gears and a first sun gear, said second simple planetary gear unit including a second ring gear, a second planetary carrier of second pinion gears and a second sun gear, said second ring gear being connected to said first sun gear and functioning as one of a reaction force element and an input element, said first transmission means further includes a first power delivering member connecting said first and second planetary carriers, and a first friction element for selectively connecting said first ring gear to a fixed housing of said automatic transmission;

said second transmission means includes a third simple planetary gear unit having a third ring gear, third planetary carrier of pinion gears, and a third sun gear, said third simple planetary gear unit being connected to said first power delivering member and selectively changing a transmission gear ratio of said first transmission means.

2. The power train of claim 1, further comprising:

a second friction element selectively connecting said first and second transmission means such that said second transmission means outputs a transmission gear ratio equal to said transmission gear ratio of said first transmission means.

3. The power train of claim 1, wherein said third sun gear is connected to said first power delivering member.

4. The power train of claim 3, further comprising:

a one-way clutch preventing said third sun gear from rotating in a direction opposite to a rotation direction of said engine.

5. The power train of claim 3, further comprising:

a second friction element enabling said third ring gear to function as a reacting force element.

6. The power train of claim 3, further comprising:

a second friction element selectively connecting said third planetary carrier to said first power delivery member such that said second transmission means outputs a transmission gear ratio equal to said transmission gear ratio of said first transmission means.

7. The power train of claim 1, wherein said means for selectively connecting includes a second friction element selectively connecting said third sun gear to said stator.

8. The power train of claim 1, wherein said means for selectively connecting connects said second transmission means to said stator when said stator reaches a predetermined speed.

9. The power train of claim 1, further comprising:

a second friction element for selectively enabling said second ring gear to function as a reaction element.

10. The power train of claim 9, wherein said first sun gear is connected to said turbine so as to function as an input member.

11. The power train of claim 1, wherein said second sun gear is connected to said turbine so as to function as an input member; and further comprising, a second friction element selectively connecting said second ring gear to said turbine such that said output speed of said first transmission means equals an output speed of said turbine.

12. The power train of claim 11, wherein said compound planetary gear unit includes a damper for reducing impact to an input side thereof when said second friction element connects said second ring gear to said turbine.

13. The power train of claim 1, wherein said first and second transmission means are mounted on a same shaft.

14. The power train of claim 1, wherein said third transmission means includes a transfer driving sprocket which is directly connected to said second transmission mechanism, a transfer driven sprocket connected to an output shaft, and a chain connecting said transfer driving sprocket and said transfer driven sprocket.

15. The power train of claim 1, wherein said third transmission means includes a simple planetary gear unit having a fourth sun gear, a fourth planetary carrier of fourth pinion gears, and a fourth ring gear, said fourth sun gear functioning as a reacting force element, said fourth planetary carrier functioning as an output element, and said fourth ring gear connected to said second transmission means and functioning as an input element.

16. The power train of claim 1, wherein said third transmission means includes a simple planetary gear unit having a fourth sun gear, a fourth planetary carrier of fourth pinion gears, and a fourth ring gear, said fourth ring gear functioning as a reacting force element, said fourth planetary carrier functioning as an output element, and said fourth sun gear connected to said second transmission means and functioning as an input element.

17. The power train of claim 1, wherein said third transmission means includes a transfer driving sprocket which is directly connected to said second transmission means, a first gear in a gear relationship with said transfer driving sprocket and connected to an output shaft, a second gear, smaller than said first gear, connected to said output shaft, and a transfer driven gear in a gearing relationship with said second gear.

18. The power train of claim 1, wherein said third ring gear is connected to said first power delivering member.

19. The power train of claim 18, further comprising:

a one-way clutch preventing said third sun gear from rotating in a direction opposite to a rotation direction of said engine.

20. The power train of claim 18, further comprising:

a second friction element enabling said third sun gear to function as a reacting force element.

21. The power train of claim 18, further comprising:

a second friction element selectively connecting said third planetary carrier to said first power delivery member such that said second transmission means outputs a transmission gear ratio equal to said transmission gear ratio of said first transmission means.

22. The power train of claim 1, wherein said means for selectively connecting includes a second friction element selectively connecting said third ring gear to said stator.

23. A power train of an automatic transmission for a vehicle, comprising:

a torque converter for receiving power from an engine and having an impeller, a stator and a turbine;

transmission means, connected to said turbine, for selectively converting a speed of said turbine, said transmission means including,
  first transmission means, connected to said turbine, for selectively converting a speed of said turbine,
  second transmission means, connected to said first transmission means, for selectively converting an output speed of said first transmission mechanism,
  third transmission means, connected to said second transmission means, for reducing an output speed of said second transmission means to produce an output speed of said automatic transmission, and means for selectively connecting said second transmission means to said stator such that said output speed of said automatic transmission continuously varies between a first and second transmission gear ratio; and wherein said second transmission means includes a simple planetary gear unit including a ring gear, a planetary carrier of pinion gears, and a sun gear, said sun gear being connected to said first transmission means, and said planetary carrier being connected to said third transmission means.

24. The power train of claim 23, further comprising:

a friction element for selectively fixing said ring gear to function as a reacting force element.

25. The power train of claim 23, further comprising:

a friction element selectively connecting said sun gear and said planetary carrier.

26. The power train of claim 24, wherein said means for selectively connecting includes a friction element selectively connecting said sun gear to said stator.

27. A power train of an automatic transmission for a vehicle, comprising:

a torque converter for receiving power from an engine and having an impeller, a stator and a turbine;

transmission means, connected to said turbine, for selectively converting a speed of said turbine, said transmission means including,
  first transmission means, connected to said turbine, for selectively converting a speed of said turbine,
  second transmission means, connected to said first transmission means, for selectively converting an output speed of said first transmission mechanism,
  third transmission means, connected to said second transmission means, for reducing an output speed of said second transmission means to produce an output speed of said automatic transmission, and means for selectively connecting said second transmission means to said stator such that said output speed of said automatic transmission continuously varies between a first and second transmission gear ratio; and wherein said second transmission means includes a simple planetary gear unit including a ring gear, a planetary carrier of pinion gears, and a sun gear, said ring gear being connected to said first transmission means, and said planetary carrier being connected to said third transmission means.

28. The power train of claim 27, further comprising:

a friction element selectively fixing said sun gear to function as a reacting force element.

29. The power train of claim 27, further comprising:

a friction element selectively connecting said ring gear and said planetary carrier.

30. The power train of claim 27, wherein said means for selectively connecting includes a friction element selectively connecting said ring gear to said stator.

31. A power train of an automatic transmission for a vehicle, comprising:

a torque converter for receiving power from an engine and having an impeller, a stator and a turbine;

transmission means, connected to said turbine, for selectively converting a speed of said turbine, said transmission means including,
  first transmission means, connected to said turbine, for selectively converting a speed of said turbine,
  second transmission means, connected to said first transmission means, for selectively converting an output speed of said first transmission mechanism,
  third transmission means, connected to said second transmission means, for reducing an output speed of said second transmission means to produce an output speed of said automatic transmission, and means for selectively connecting said second transmission means to said stator such that said output speed of said automatic transmission continuously varies between a first and second transmission gear ratio; and wherein said second transmission means selectively reduces an output speed of said first transmission means.

32. The power train of claim 31, wherein said second transmission means is directly connected to said first transmission means.

* * * * *